Dec. 4, 1956   V. G. WILLIAMS   2,772,530
APPARATUS FOR FORMING, FILLING AND SEALING BAGS
Filed Jan. 30, 1953   4 Sheets-Sheet 1
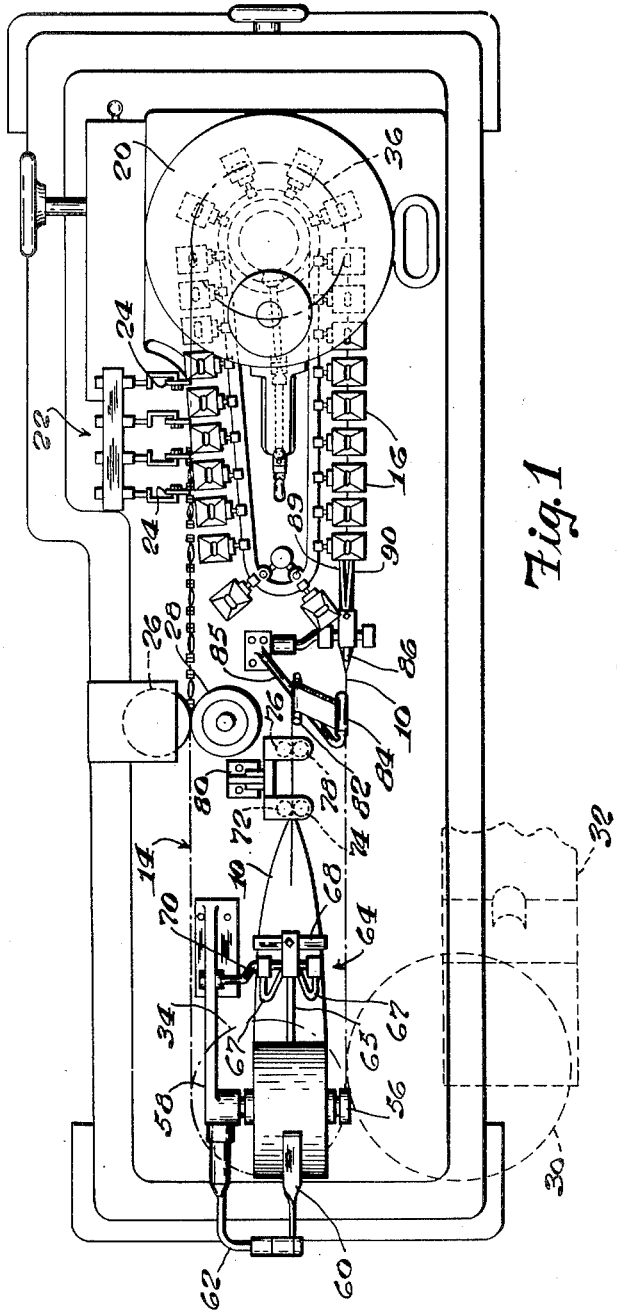
INVENTOR.
*Victor G. Williams*
BY
*J. Stanley Churchill*
ATTORNEY Dec. 4, 1956 V. G. WILLIAMS 2,772,530
APPARATUS FOR FORMING, FILLING AND SEALING BAGS
Filed Jan. 30, 1953 4 Sheets-Sheet 2
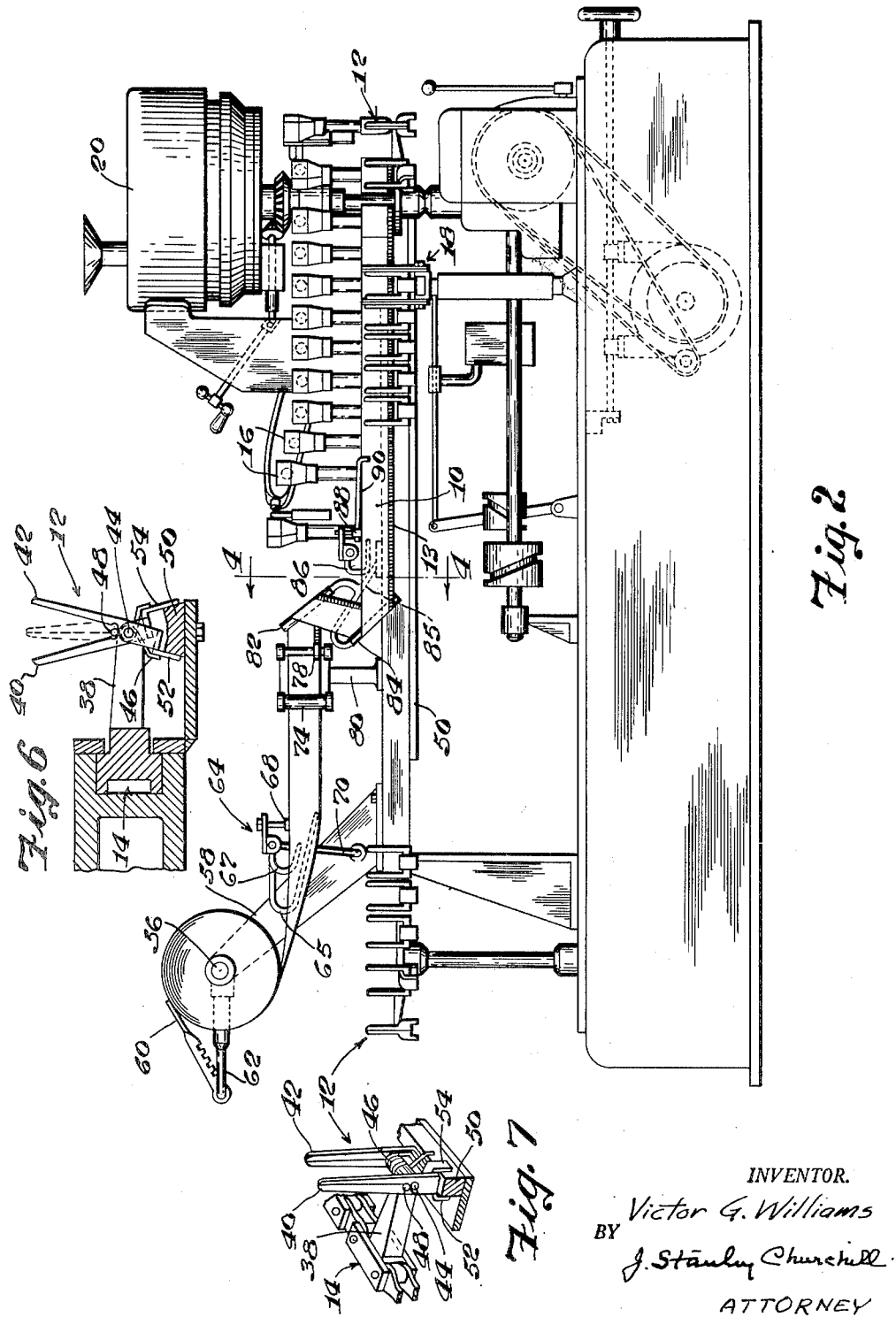
INVENTOR.
Victor G. Williams
BY J. Stanley Churchill
ATTORNEY INVENTOR.
Victor G. Williams
BY
J. Stanley Churchill
ATTORNEY

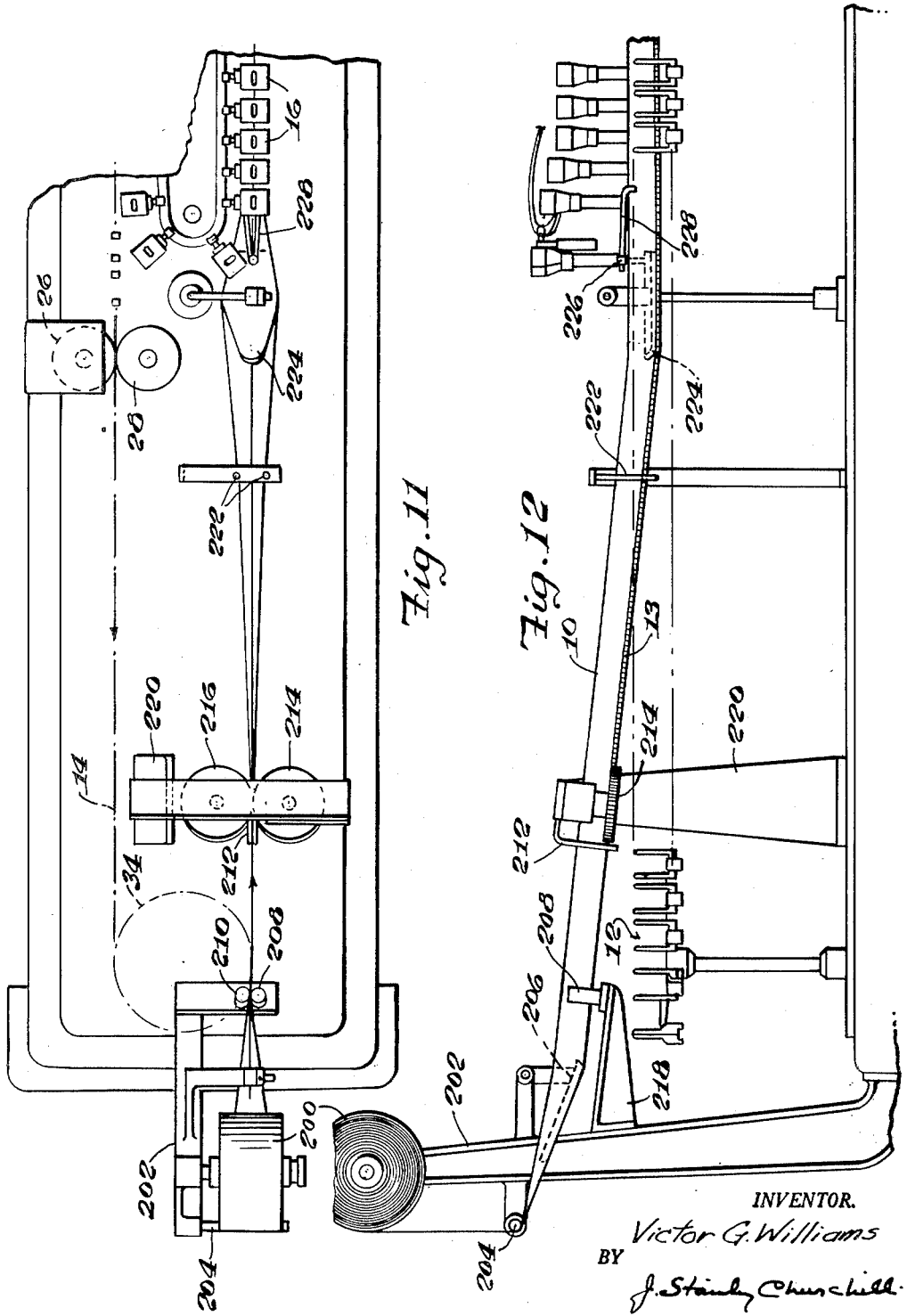

United States Patent Office 2,772,530
Patented Dec. 4, 1956

2,772,530

APPARATUS FOR FORMING, FILLING AND SEALING BAGS

Victor G. Williams, Toronto, Ontario, Canada, assignor to Delamere & Williams Company, Limited, West Toronto, Ontario, Canada, a corporation of Ontario Application January 30, 1953, Serial No. 334,171

8 Claims. (Cl. 53—180)

This invention relates to apparatus for forming, filling and sealing bags.

The invention has for an object to provide novel and improved apparatus for forming, filling and sealing bags which is capable of producing individual filled and closed bags in an efficient, economical and rapid manner.

A further object of the invention is to provide novel and improved apparatus for forming, filling and sealing bags, particularly bags of heat-sealable material having one edge folded, wherein provision is made for effecting a seal along the folded edge whereby to produce a stronger and more efficient bag.

With these general objects in view, and such others as may hereinafter appear, the invention consists in the apparatus for forming, filling and sealing bags and in the various structures, arrangements and combinations of parts hereinafter described and particularly defined in the claims at the end of this specification.

In the drawings illustrating the preferred embodiment of the invention:

Fig. 1 is a plan view of a bag-forming, filling and sealing machine embodying the present invention;

Fig. 2 is a side elevation of the machine shown in Fig. 1;

Fig. 3 is a plan view detail of a web guide member shown in Fig. 1;

Fig. 4 is a cross-sectional view taken on the line 4—4 of Fig. 2 illustrating the heat-sealing mechanism for sealing the folded edge of the strip, and guide means for guiding the strip into operative relation to the grippers;

Fig. 5 is a detail view of a filled and sealed bag produced in the present machine;

Fig. 6 is a cross-sectional view of the conveyer and the grippers showing the track on which the grippers ride;

Fig. 7 is a perspective view of a pair of grippers;

Figure 8:
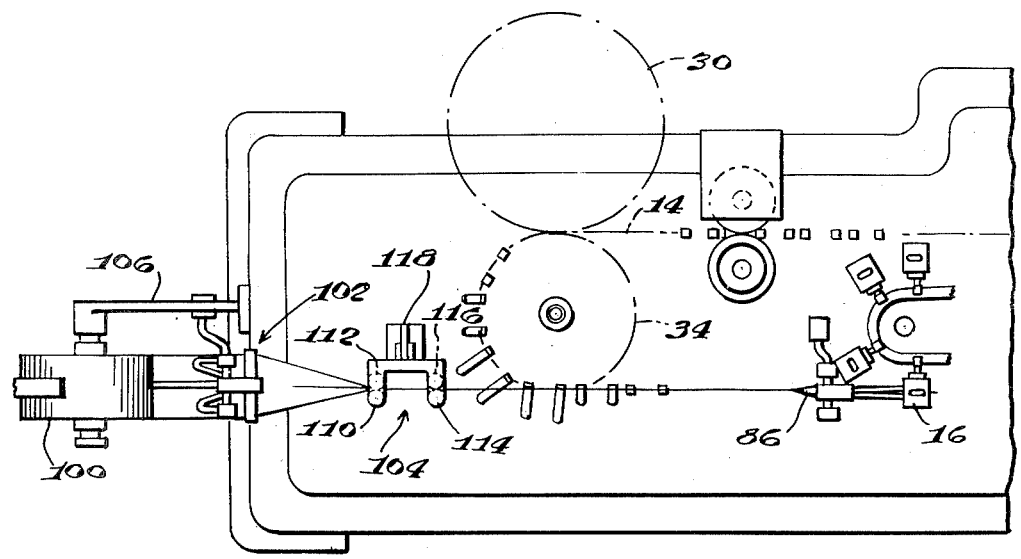
Figs. 8 and 9 are plan and side elevation views respectively of a modified form of heat-sealing and web-guiding means embodied in the present machine.
Figure 9:
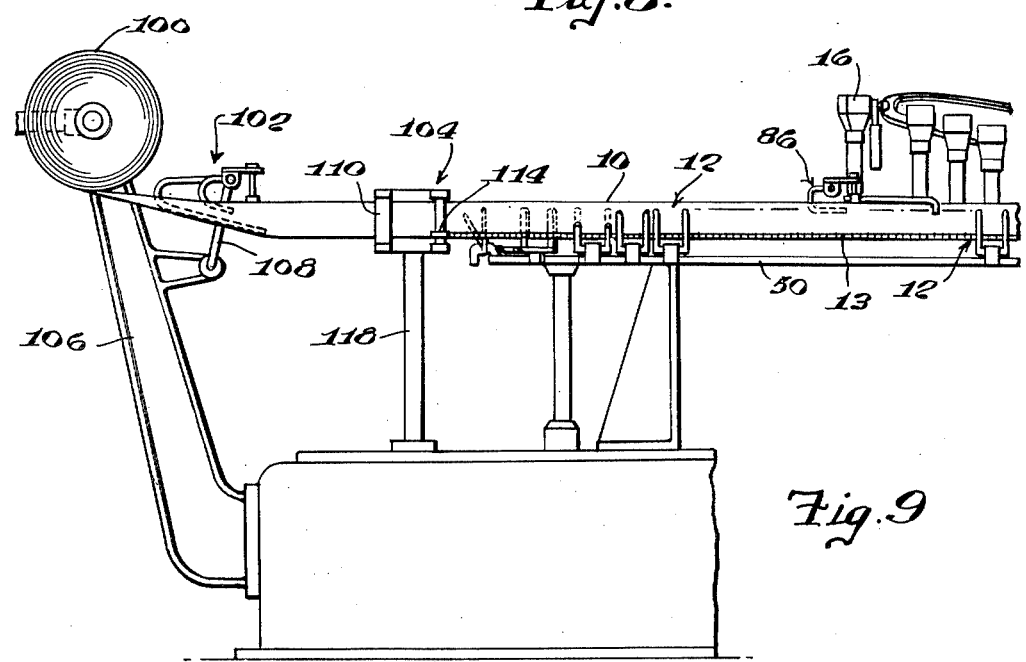
Figure 10:
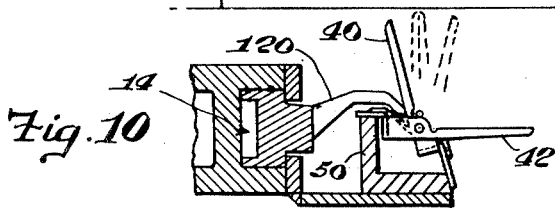

Fig. 10 is a cross-sectional view of the conveyer and the grippers employed in the machine illustrated in Figs. 8 and 9 and showing a portion of the track for opening one of the grippers to a horizontal position; and Figs. 11 and 12 are views in plan and side elevation respectively of another modified form of heat-sealing and web-guiding means embodied in the present machine for sealing the folded edge of the strip prior to its engagement between and by the grippers.

In general, the present invention is embodied in a machine for producing filled and sealed bags wherein the bags are formed from an elongated web or strip of thermoplastically treated bag-forming material folded longitudinally into a trough or V-shaped form and conveyed into operative relation to filling, severing and sealing mechanisms for producing a series of individual filled and sealed bags. The bags produced by the prior machines of this type were heat sealed along the two sides and the top of the bag, the bottom of the bag comprising the folded edge being unsealed. In the operation of the prior machines, the folded edge of the relatively fragile bag-forming material, such as the filter paper used for forming tea bags, may be weakened by the folding and forming operations so that the folded and unsealed bottom edge of the bag-forming material may be ruptured during the passage of the strip through the machine or during subsequent handling of the individual bags.

In accordance with the present invention, provision is made for producing a seal along the folded edge of the bag-forming strip prior to advancing the same into operative relation to the filling, severing and subsequent side and top-sealing mechanisms whereby to strengthen and reinforce the folded edge producing a stronger and more rigid bag less likely to be broken along the folded edge during subsequent operations of the machine or during subsequent handling of the completed bag.

Referring now to the drawings, the present invention may be embodied in any of the prior bag-making machines adapted to form a series of bags from a folded strip of heat-sealable bag-making material, and as shown, in Figs. 1 and 2, the illustrated machine is arranged to continuously advance a longitudinally folded strip 10 between grippers 12 carried by a continuously moving conveyer 14 and which grasp the web transversely dividing it into sections which form a plurality of bags. The folded strip 10 is advanced by the grippers 12 beneath filling funnels 16 moving in synchronism with the bag sections, and then past shears, indicated generally at 18, which cut the web transversely between the bag sections to form individual packages or bags 11. In operation, as each bag section passes beneath a funnel 16, the end of the funnel is brought down into the open mouth of its respective bag and a measured quantity of the material being packaged is dropped into the funnel from a feed hopper 20 forming a part of the filling mechanism, and the material in the funnel enters the bag during the continuous advance of the funnels and the bags. The funnel is then retracted, and the bag passes between opposed reciprocating heat-sealing members, indicated generally at 22, one of the heat-sealing members being provided with rollers 24 which compress the side edges of the bag together. The heat-sealing members 22 are adapted to move with the continuously advanced bags, and subsequently release the formed bags and move back to seal the next successive bag or bags in the same manner. During the continuous advance, the bags are then successively passed between heat-sealing rollers 26, 28 which operate to seal the upper edge or mouth of the bags, and the bags are then carried to transfer mechanism, indicated generally by dotted lines at 30 where the grippers release the bags. The released bags are removed from the grippers by the transfer mechanism and deposited on an outgoing conveyer 32 to be delivered from the machine.

The above is a general description of the operation of a typical machine for forming, filling and sealing bags embodying the present invention, only sufficient portions thereof being herein shown and described to enable the present invention to be understood. The feed hopper 20, conveyer 14 and filling mechanism 16 may in general comprise mechanisms similar to those described in the United States Patent No. 2,351,382, dated June 13, 1944.

As illustrated in Figs. 1 and 2, the grippers 12 are mounted on an endless carrier or conveyor 14 in the form of a chain which is arranged to run around sprockets 34, 36 at each end of the machine. Projecting from the chain 14 are a plurality of equally spaced arms 38 on which are pivotally mounted the grippers 12. As illustrated in detail in Figs. 6 and 7, the grippers comprise U-shaped fingers 40, 42 rockingly mounted on a pivot pin 44 which extends through the end of arm 38, the fingers being adapted to swing on the pivot pin 44 so as to bring the opposed fingers together and clamp a strip of bag-forming material between them. A coil spring 46 passes around pivot pin 44 and engages the cross pieces of the fingers tending to force them together. A pin 48 mounted on arm 38 extends parallel to the pin 44 between the fingers 40, 42 and acts as a stop to hold them in a vertical position when closed.

In operation, the grippers 12 are arranged to slide on a bar or track 50, the fingers 40, 42 being provided with downwardly extended lugs 52, 54 at each side for engagement with the sides of the track 50. At the point where the strip of bag-forming material 10 is fed to the machine, the track 50 is spread, as shown in Fig. 6, thus forcing the lugs 52, 54 outwardly and spreading the gripper fingers so that the folded strip may be fed between them. When the strip has been received between the grippers, the track 50 narrows permitting the gripper members to close under the influence of the spring 46, thus gripping the folded bag material. The track 50 is discontinued at the transverse shearing mechanism 18 and is again continued beyond the shearing mechanism.

In accordance with the present invention, provision is made for effecting a heat seal along the bottom or folded edge of the strip 10 prior to feeding the strip between the gripper members 12. The bag-forming material may comprise a flexible sheet containing a thermoplastic heat and pressure-responsive binding material so that when two layers or plies of the sheet are brought together in face-to-face contact and subjected to the application of heat and pressure, they will become adhesively united. As herein shown, the bag-forming material may be mounted in roll form on a spindle 56 supported in a bracket 58 attached to the machine frame. A friction device 60 is pivotally mounted on an arm 62 extended from the bracket 58 and rests on the supply roll as illustrated.

In the embodiment of the invention illustrated in Figs. 1 and 2, the web of bag-forming material withdrawn from the supply roll passes under web-folding mechanism, indicated generally at 64, disposed above and spaced laterally from the plane of the grippers 12. As herein shown, the folding mechanism may comprise a central downwardly sloping rod 65 and side guide rods 67 arranged to fold the web longitudinally along the center of the web during the continuous advance thereof. A transverse bar 68 is arranged to engage the upper edges of the strip to form an upper guide. The web-folding and guiding mechanism 64 may be adjustably supported on a rod 70 extended from the bracket 58, as shown. The strip then passes between a pair of vertical guide rolls 72, 74 arranged to flatten the folded strip to bring the two sides thereof in face-to-face contact, and the strip then passes between a pair of heat-sealing rolls 76, 78 arranged to apply heat and pressure to the lower marginal edge of the strip to effect a continuous heat seal along the folded edge, as indicated at 13. As herein shown, the guide rolls 72, 74 and the heat-sealing rolls 76, 78 may be supported in a bracket 80 attached to the machine frame, as shown.

The folded and bottom sealed strip is then guided downwardly between the open grippers 12 therebeneath. As herein shown, the strip is arranged to pass over an inclined upper guide roller 82 disposed substantially in alignment with the strip in the upper plane, and then under an inclined lower guide roller 84 disposed between and in alignment with the plane of the grippers. The guide rollers 82, 84 are mounted on rods extended from a bracket 85 attached to the machine frame and are inclined at an angle of approximately forty-five degrees in a direction opposite to the travel of the strip. As a result, the strip is guided in a horizontal plane between the open grippers, as illustrated. When the strip leaves the lower roller 84, the two sides of the strip are closed, and in order to spread the sides apart to permit the filling funnels to enter therebetween, a plow-shaped guide member 86 is inserted therebetween, as shown in Fig. 3. Thereafter, a transverse bar 88 is adapted to engage the upper edges of the strip to retain the same between the opened grippers, and as the strip is advanced, two diverging fingers 89, 90 having downwardly extended hooked ends are adapted to engage the outer sides of the edges of the strip to draw them inwardly against the funnels. At this point, the track 50 narrows, as above described, permitting the fingers 40, 42 to close and grasp the strip between them and fold the sides of the strip around successive nozzles. Thereafter, the strip is advanced through the machine to be cut into individual bags, filled and sealed along the sides and top, as described.

Referring now to Figs. 8 and 9, a modified form of the invention embodied in the present bag-making, filling and sealing machine is arranged to fold the web and form a seal along the folded edge in a horizontal plane coextensive with the receiving run of the gripper conveyer and immediately prior to feeding of the strip between the grippers 12. As herein shown, the supply roll 100, folding mechanism 102, and sealing mechanism 104 are disposed to the left of and in alignment with the receiving run of the conveyer, the supply roll 100 being supported in a bracket 106 attached to the machine frame. The folding mechanism 102 may be constructed in a manner similar to that previously described to form a V-shaped strip, and may be adjustably supported in an arm 108 extended from the bracket 106, as illustrated. The folding rolls 110, 112 and the heat-sealing rolls 114, 116 which may also be similar in structure and mode of operation to those above described are supported in a bracket 118 upstanding from the machine frame.

In the modified form of the invention shown in Figs. 8 and 9, the folded and bottom sealed strip enters the end of the receiving run of the conveyer just as the grippers 12 passing around the end sprocket 34 come around into alignment with the straight run on the receiving side of the conveyer, and in order to permit the folded web to enter at this point, provision is made for rocking the outer gripper finger 42 down to a horizontal position to avoid interference with the web. As shown in Fig. 10, this may be accomplished by shaping the cam track 50 as illustrated so that as the gripper fingers 42 approach the beginning of the straight run in passing around the sprocket 34, they are gradually rocked outwardly and downwardly to a horizontal position, as shown. The gripper supporting arms 120, connected to the conveyer chain 14, may be shaped as illustrated in Fig. 10 so as to avoid interference with the high point of the cam track 50. The folded and bottom sealed strip may then be advanced to engage the plow-shaped spreading member 86 arranged to open the top of the strip, and the filling funnels 16 are brought down between the sides of the open strip as previously described whereupon the bag sections are severed, filled and sealed in the usual manner during their passage through the machine.

Figs. 11 and 12 illustrate another modified form of the invention embodied in the present bag-making, filling and closing machine wherein the strip is folded into V-shape and sealed along the folded edge in a plane above the gripper conveyer and while being guided at an angle such as to gradually lower the strip down between the open grippers to be gripped and advanced through the machine in the usual manner. As herein shown, the supply roll 200 is supported in a bracket 202 attached to the machine frame, and the web of bag-forming material withdrawn therefrom is arranged to pass around a guide roll 204 and under a V-shaped former 206 arranged to fold the web into a trough-shaped strip. The forming member 206 is disposed above the plane of the grippers 12, and the strip extends downwardly at an angle from the end of the forming member 206 to a point between the grippers where the strip is guided in a horizontal plane in operative position to be gripped and advanced by the conveyer.

As shown in Fig. 12, after passing under the forming member 206 the strip passes between cooperating guide rolls 208, 210 to be folded along the bottom edge and then between guide rods 212 immediately preceding a pair of cooperating heat-sealing rollers 214, 216 arranged to form a heat seal along the bottom marginal edge of the strip during the continuous advance of the strip therebetween. The folding rolls 208, 210 are supported on an extension 218 attached to the bracket 202 and are positioned perpendicularly with respect to the angular disposition of the longitudinally extended strip. The guide rods 212 and heat-sealing rollers 214, 216 are supported in a standard 220 secured to the machine frame and are likewise arranged with their axes at right angles to the line of the angle formed by the strip. The folded and bottom sealed strip is then passed between guide rods 222 defining a V-shape arranged to guide the sides of the strip inwardly to prevent interference with the opened gripper fingers as the strip passes down between the fingers. The strip then passes under a guide shoe 224 arranged to guide the strip from its angular position to a horizontal position, the guide shoe causing the sides of the strip to separate as the strip changes direction. A transverse bar 226 engaging the top edges of the strip serves as an upper guide, and the arms 228 serve to guide the edges of the strip inwardly as the filling funnels 16 are lowered into the open strip. Thereafter, the grippers 12 are closed to fold the sides of the strip around the funnels as described, whereupon the strip is advanced through the machine to be filled and closed in the conventional manner.

From the above description it will be seen that the present bag-forming, filling and sealing machine is adapted to form a continuous heat seal along the folded edge of a bag-forming strip during the passage of the strip into the machine and prior to feeding the strip into operative relation to the filling and subsequent sealing mechanisms whereby to produce a flat pillow or envelope type bag sealed on four sides, thus producing a stronger and more rigid bag reinforced along its folded edge and capable of withstanding handling and use without breaking along the folded edge of the bag.

While the preferred embodiment of the invention has been herein illustrated and described, it will be understood that the invention may be embodied in other forms within the scope of the following claims.

Having thus described the invention, what is claimed is:

1. In a bag-making and filling machine of the character described, in combination, an endless carrier including a plurality of grippers for continuously advancing a longitudinally folded strip of bag-forming material into operative relation to bag forming, filling and closing mechanism, and auxiliary sealing means for sealing the contacting faces of the folded strip along the folded marginal edge only thereof during said continuous advance and prior to being engaged by said gripper carrier, said auxiliary sealing means including a pair of cooperating heat-sealing rollers engageable with said folded marginal edge during the continuous advance thereof, and a pair of cooperating guide rolls immediately preceding said heat-sealing rolls to guide and maintain the sides of the folded strip in face to face contact during said sealing operation, said marginal seal serving to reinforce said folded edge to prevent rupture thereof during subsequent bag-forming and filling operations.

2. In a bag-making and filling machine of the character described, in combination, an endless carrier including a plurality of grippers for continuously advancing a longitudinally folded strip of bag-forming material into operative relation to bag forming, filling and closing mechanism, and auxiliary sealing means for sealing the contacting faces of the folded strip along the folded marginal edge only thereof during said continuous advance and prior to being engaged by said carrier, and means for guiding the folded and marginally sealed strip into operative position to be engaged and advanced by said carrier, said auxiliary sealing means including a pair of cooperating heat-sealing rollers engageable with said folded marginal edge during the continuous advance thereof, and a pair of cooperating guide rolls immediately preceding said heat-sealing rolls to guide and maintain the sides of the folded strip in face to face contact during said sealing operation, said marginal seal serving to reinforce said folded edge to prevent rupture thereof during subsequent bag-forming and filling operations.

3. In a bag-making and filling machine of the character described, in combination, an endless carrier including a plurality of grippers for continuously advancing a longitudinally folded strip of bag-forming material into operative relation to bag forming, filling and closing mechanism, and auxiliary sealing means for sealing the contacting faces of the folded strip along the folded marginal edge only thereof during said continuous advance and prior to being engaged by said carrier, said marginal sealing means being disposed above the plane of said carrier, and means for guiding the strip from said sealing means into operative position to be engaged and advanced by said gripper carrier, said auxiliary sealing means including a pair of cooperating heat-sealing rollers engageable with said folded marginal edge during the continuous advance thereof, and a pair of cooperating guide rolls immediately preceding said heat-sealing rolls to guide and maintain the sides of the folded strip in face to face contact during said sealing operation, said marginal seal serving to reinforce said folded edge to prevent rupture thereof during subsequent bag-forming and filling operation.

4. In a bag-making and filling machine of the character described, in combination, an endless carrier including a plurality of grippers for continuously advancing a longitudinally folded strip of bag-forming material into operative relation to bag forming, filling and closing mechanism, auxiliary sealing means disposed above the plane of the carrier for sealing the contacting faces of the folded strip along the folded marginal edge only thereof during said continuous advance and prior to being engaged by said carrier, means for guiding the folded and marginally sealed strip into operative position to be engaged and advanced by said carrier, and means disposed between said contacting faces for opening the top of the strip prior to being engaged by the carrier to permit introduction of a commodity between said faces, said auxiliary sealing means including a pair of cooperating heat-sealing rollers engageable with said folded marginal edge during the continuous advance thereof, and a pair of cooperating guide rolls immediately preceding said heat-sealing rolls to guide and maintain the sides of the folded strip in face to face contact during said sealing operation, said marginal seal serving to reinforce said folded edge to prevent rupture thereof during subsequent bag-forming and filling operations.

5. In a bag-making and filling machine of the character described, in combination, an endless carrier including a plurality of grippers for continuously advancing a longitudinally folded strip of bag-forming material into operative relation to bag-forming, filling and closing mechanism, means for forming the folded strip comprising means for supporting a supply roll of the bag-forming material, means for folding the material being withdrawn from the roll into a V-shaped strip, means for folding the two sides of the V-shaped strip together in face-to-face contact, auxiliary sealing means disposed above the plane of the carrier for sealing the contacting portions of the strip along the folded marginal edge only thereof during said continuous advance and prior to being engaged by said carrier gripper, and means for guiding the folded and marginally sealed strip into operative position to be engaged and advanced by said carrier, said auxiliary sealing means including a pair of cooperating heat-sealing rollers engageable with said folded marginal edge during the continuous advance thereof, and a pair of cooperating guide rolls immedaitely preceding said heat-sealing rolls to guide and maintain the sides of the folded strip in face to face contact during said sealing operation, said marginal seal serving to reinforce said folded edge to prevent rupture thereof during subsequent bag-forming and filling operations.

6. In a bag-making and filling machine of the character described, in combination, an endless carrier provided with a plurality of equally spaced grippers, each comprising a pair of jaws adapted to grip and continuously advance a longitudinally folded strip of heat-sealable bag-forming material into operative relation to bag forming, filling and closing mechanism, actuating means for opening and closing said grippers, means for forming the folded strip comprising a forming member engageable with a web of the material withdrawn from a supply thereof and arranged to fold the material into a V-shaped strip, a pair of cooperating rolls for folding the sides of the strip together in face-to-face contact, a pair of cooperating heat-sealing rollers disposed above the plane of the carrier for sealing the contacting portions of the strip along the folded marginal edge only during the continuous advance thereof and prior to being engaged by said grippers, and means for guiding the folded and marginally sealed strip into operative position between the open grippers of the carrier, said grippers being subsequently closed upon the strip to advance the same, said cooperating folding rolls being disposed immediately prior to said heat-sealing rolls to guide and maintain the strip with the two sides in a flattened condition during said sealing operation, said marginal seal serving to reinforce said folded edge to prevent rupture thereof during subsequent bag-forming and filling operations.

7. In a bag-making and filling machine of the character described, in combination, an endless carrier including a plurality of grippers for continuously advancing a longitudinally folded strip of bag-forming material into operative relation to bag-forming, filling and closing mechanism, means for forming the folded strip comprising means for supporting a supply roll of the bag-forming material, means for folding the material being withdrawn from the roll into a V-shaped strip, means for folding the two sides of the V-shaped strip together in face-to-face contact, auxiliary sealing means disposed above the plane of the carrier for sealing the contacting portions of the strip along the folded marginal edge only thereof during said continuous advance and prior to being engaged by said carrier, means for guiding the folded and marginally sealed strip into operative position to be engaged and advanced by said carrier, and a stationary guide member interposed between the contacting faces for opening the top of the strip being advanced between the open grippers to permit introduction of the commodity being packaged, said sealing means comprising a pair of cooperating heat-sealing rollers, and said folding means comprising a pair of rolls disposed immediately prior to said heat-sealing rolls to guide and maintain the strip with the two sides in a flattened condition during said sealing operation, said marginal seal serving to reinforce said folded edge to prevent rupture thereof during subsequent bag-forming and filling operations.

8. A bag-making machine as defined in claim 6 wherein the strip-folding and marginal-sealing means disposed above the plane of said carrier is angularly arranged with respect thereto, said guide means including a guide shoe disposed in the plane of said carrier, said strip extending angularly from said forming member through said sealing means and under said guide shoe to guide the strip to the plane of said carrier.

References Cited in the file of this patent

UNITED STATES PATENTS

| | | |
|---|---|---|
| 1,237,595 | Wood | Aug. 21, 1917 |
| 2,248,471 | Stropp | July 8, 1941 |
| 2,269,532 | Howard | Jan. 13, 1942 |
| 2,330,361 | Howard | Sept. 28, 1943 |
| 2,512,216 | Salfisberg | June 20, 1950 |